United States Patent
Funakubo et al.

(10) Patent No.: US 9,956,694 B2
(45) Date of Patent: May 1, 2018

(54) MOTOR AND MECHANISM HAVING FUNCTION OF INCREASING OR DECREASING BRAKE TORQUE

(71) Applicant: FANUC CORPORATION, Yamanashi (JP)

(72) Inventors: Makoto Funakubo, Yamanashi (JP); Tougo Nagahata, Yamanshi (JP)

(73) Assignee: FANUC CORPORATION, Yamanshi (JP)

( * ) Notice: Subject to any disclaimer, the term of this patent is extended or adjusted under 35 U.S.C. 154(b) by 0 days. days.

(21) Appl. No.: 15/454,025

(22) Filed: Mar. 9, 2017

(65) Prior Publication Data

US 2017/0274540 A1    Sep. 28, 2017

(30) Foreign Application Priority Data

Mar. 25, 2016    (JP) .................. 2016-062688

(51) Int. Cl.
| | |
|---|---|
| B25J 9/18 | (2006.01) |
| G05B 19/19 | (2006.01) |
| B25J 19/00 | (2006.01) |
| H02K 11/24 | (2016.01) |
| B25J 9/16 | (2006.01) |
| B25J 13/08 | (2006.01) |
| B25J 19/06 | (2006.01) |
| H02K 11/00 | (2016.01) |
| H02P 29/00 | (2016.01) |

(52) U.S. Cl.
CPC ......... B25J 19/0004 (2013.01); B25J 9/1674 (2013.01); B25J 13/085 (2013.01); B25J 19/06 (2013.01); H02K 11/0094 (2013.01); H02K 11/24 (2016.01); H02P 29/0022 (2013.01)

(58) Field of Classification Search
CPC ...... B25J 19/0004; B25J 9/1674; H02H 11/24
USPC .................................................. 318/568.11
See application file for complete search history.

(56) References Cited

U.S. PATENT DOCUMENTS

| | | | |
|---|---|---|---|
| 2006/0152098 A1* | 7/2006 | Horst .................... | H02K 99/20 310/120 |
| 2007/0096670 A1* | 5/2007 | Hashimoto ............... | H02P 3/04 318/369 |
| 2008/0185199 A1* | 8/2008 | Kimura ................. | B60K 6/445 180/242 |

(Continued)

FOREIGN PATENT DOCUMENTS

| | | |
|---|---|---|
| JP | 6334086 A | 2/1988 |
| JP | 200554843 A | 3/2005 |
| JP | 2009291363 A | 12/2009 |

OTHER PUBLICATIONS

English Abstract and Machine Translation for Japanese Publication No. 2005-054843 A, published Mar. 3, 2005, 14 pgs.

(Continued)

*Primary Examiner* — Erick Glass
(74) *Attorney, Agent, or Firm* — Fredrikson & Bryon, P.A.

(57) ABSTRACT

A motor according to the present invention includes an output axis, a brake for holding the output axis, a sensor for detecting an external torque applied to the output axis from outside, and a controller for decreasing or increasing the torque of the brake during operation of the brake in accordance with an increase or decrease in the external torque detected by the sensor.

6 Claims, 6 Drawing Sheets

(56) References Cited

U.S. PATENT DOCUMENTS

2011/0139555 A1* 6/2011 Hori ................ B60T 13/741
                                                         188/72.1
2013/0154522 A1* 6/2013 Verheyen ............ H02P 3/04
                                                         318/372

OTHER PUBLICATIONS

English Abstract and Machine Translation for Japanese Publication No. 2009-291363 A, published Dec. 17, 2009, 23 pgs.
English Machine Translation for Japanese Publication No. JPS63-034086 A, published Feb. 13, 1988, 4 pgs.

* cited by examiner

MOTOR AND MECHANISM HAVING FUNCTION OF INCREASING OR DECREASING BRAKE TORQUE

This application is a new U.S. patent application that claims benefit of JP 2016-062688 filed on Mar. 25, 2016, the content of 2016-062688 is incorporated herein by reference.

BACKGROUND OF THE INVENTION

1. Field of the Invention

The present invention relates to a motor and a mechanism, and in particular relates to a motor and a mechanism having the function of increasing or decreasing a brake torque.

2. Description of Related Art

To lock output axes of motors in cases of emergency stops or power failures, the motors are generally equipped with holding brakes that are operated without excitation (for example, Japanese Unexamined Patent Publication (Kokai) No. 2005-54843). Constant and high brake torque is required of the holding brakes. Thus, the holding brakes can supply holding torque required to lock the output axes, even when the holding brakes are not energized. For example, when the motors are used for driving joints of robots, the holding brakes serve to support the self-weight of the robots, even in cases of emergency stops or power failures, thus allowing maintaining the posture of the robots.

FIG. 1 is a block diagram of a conventional motor having a holding brake inside the motor. A motor 1000 includes an output axis 1001 and a holding brake (hereinafter also simply called "brake") 1002. To the brake 1002, only a brake operation signal is inputted from a controller 1004 disposed outside the motor 1000. A brake torque is constant at this time.

FIG. 2 is a block diagram of a conventional mechanism of a robot in which a holding brake is disposed outside a motor (inside a decelerator, between an arm and the decelerator, or the like). A mechanism 2000 includes an output axis 1001A, a brake 1002A, and a decelerator 1006. A motor 1000A is disposed in a first arm 1007. The mechanism 2000 is disposed between the first arm 1007 and a second arm 1008. To the brake 1002A, only a brake operation signal is inputted from a controller 1004A disposed outside the mechanism 2000. A brake torque is constant at this time.

In the conventional art, since the brake torque of the holding brake is constant and high, the output axis of the motor cannot be easily rotated during operation of the brake, even if an external torque is applied to the output axis of the motor. Also in the case of the robot, as a matter of course, the robot cannot be easily moved (the posture of the robot cannot be changed) during operation of the holding brake of the motor, even if a person pushes the arms of the robot. Thus, when the robot is stopped during operation and the motor cannot be driven, the robot cannot be moved from the posture at the time of stopping.

Conventionally, when motors are stopped in cases of emergency stops, power failures, or the like, brakes lock the rotation of output axes of the motors. At this time, the following equation holds true during operation of the brakes.

Brake torque (constant value) Tb>>Holding torque Th of output axis wherein, "holding torque Th of output axis" represents torque required to lock the output axes of the motors.

Since brake torque Tb is sufficiently high, people cannot rotate the output axes during operation of the brakes. The motors having this configuration are often used for driving joints of robots in general, and therefore when the motors are stopped under the application of the brakes, it is not easy for the people to move arms of the robots by pushes on the arms.

SUMMARY OF THE INVENTION

The present invention aims at providing a motor and a mechanism that can move a robot into an arbitrary posture, even when the motor cannot be driven due to an emergency stop, a power failure, or the like.

A motor according to an embodiment of the present invention includes an output axis, a brake for holding the output axis, a sensor for detecting an external torque applied to the output axis from outside, and a controller for decreasing or increasing the torque of the brake during operation of the brake in accordance with an increase or decrease in the external torque detected by the sensor.

A mechanism according to an embodiment of the present invention is a mechanism having a drive motor. The mechanism includes an output axis of the mechanism, a brake for holding the output axis, a sensor for detecting an external torque applied to the output axis from outside, and a controller for decreasing or increasing the torque of the brake during operation of the brake in accordance with an increase or decrease in the external torque detected by the sensor.

BRIEF DESCRIPTION OF THE DRAWINGS

The objects, features, and advantages of the present invention will be more apparent from the following description of embodiments in conjunction with the attached drawings, wherein.

DETAILED DESCRIPTION OF THE INVENTION

A motor and a mechanism according to the present invention will be described below with reference to the drawings.

[First Embodiment]

Figure 1:
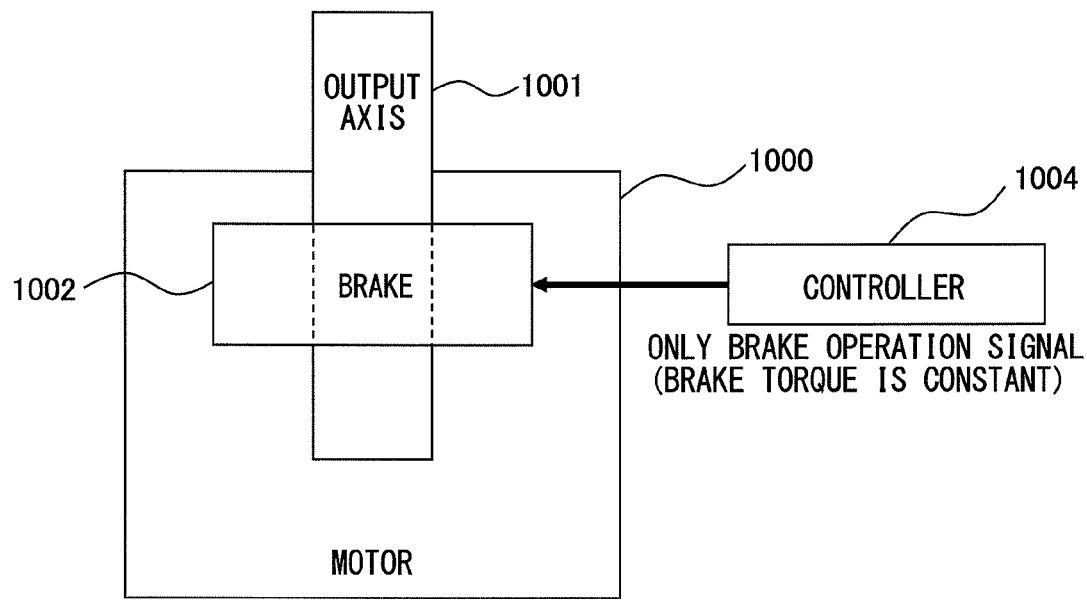
FIG. 1 is a block diagram of a conventional motor having a holding brake inside the motor.
Figure 2:
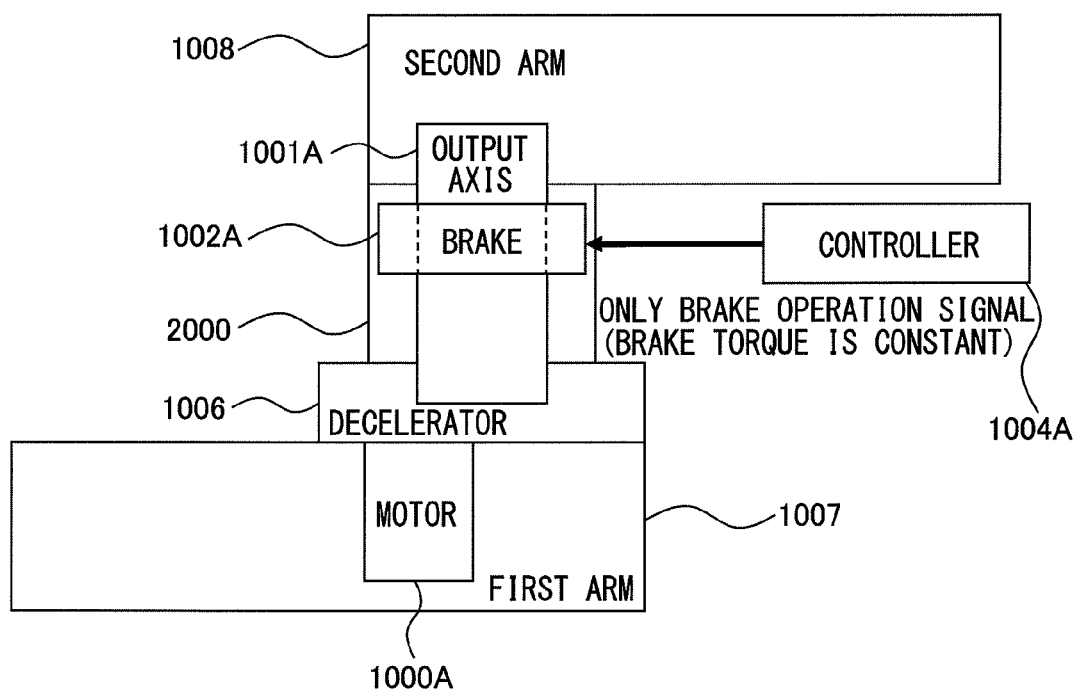
FIG. 2 is a block diagram of a conventional mechanism of a robot in which a holding brake is disposed outside a motor.
Figure 3:
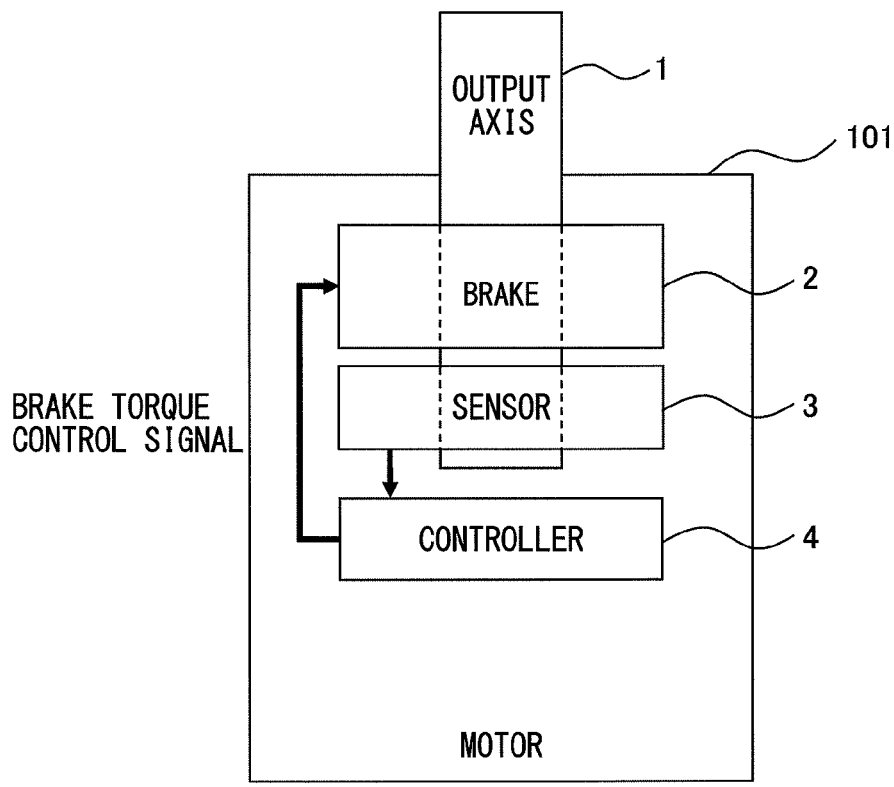
FIG. 3 is a block diagram of a motor according to a first embodiment of the present invention.

A motor according to a first embodiment of the present invention will be described. FIG. 3 is a block diagram of the motor according to the first embodiment of the present invention. A motor 101 according to the first embodiment of the present invention includes an output axis 1, a brake 2, a sensor 3, and a controller 4.

The brake 2 holds the output axis 1. As the brake 2, a powder brake, an electromagnetic brake, a magnetic hysteresis brake, or the like can be used. The electromagnetic brake is a brake that controls a gap using a current value. However, not limited thereto, another brake may be used.

The sensor 3 detects an external torque applied from outside to the output axis 1. The external torque data detected by the sensor 3 is outputted to the controller 4. As the sensor 3, an acceleration sensor, a strain sensor, or the like can be used. However, not limited thereto, another sensor may be used.

The controller 4 decreases or increases the torque of the brake 2 during operation of the brake 2 in accordance with an increase or decrease in the external torque detected by the sensor 3. To decrease or increase the torque of the brake 2, the controller 4 outputs a brake torque control signal to the brake 2.

FIG. 3 shows an example of the motor according to the first embodiment in which the brake 2, the sensor 3, and the controller 4 are disposed inside the motor 101, but a part or all of these components may be disposed outside the motor 101. Furthermore, the output axis 1 may be fitted later to the motor 101.

Next, a method for controlling the torque of the brake 2 by the controller 4 in the motor according to the first embodiment of the present invention will be described.

When the motor 101 is stopped under the application of the brake 2, a motor torque To, that is, a torque applied to the output axis 1 of the motor is represented by the following equation (1) using a load torque Tf, which depends on machine conditions, and an external torque Tm.

$$To = Tf + Tm \quad (1)$$

When Tb represents a brake torque, that is, the torque of the brake 2 to hold the output axis 1 of the motor, the following equation (2) is required to be satisfied to rotate the output axis 1 of the motor.

$$To > Tb \quad (2)$$

On the other hand, to lock the output axis 1 of the motor, the following equation (3) is required to be satisfied.

$$To \leq Tb \quad (3)$$

When the brake 2 is applied, in general, the following equations hold true to be sure to lock the output axis 1 of the motor.

$$Tb \gg Tf$$

$$Tb - Tf \gg 0 \quad (4)$$

From the equations (1), (2), and (4), following equations are obtained.

$$To = Tf + Tm > Tb$$

$$Tm > Tb - Tf (\gg 0) \quad (5)$$

That is, an extremely high external torque Tm is required to rotate the output axis 1 of the motor during operation of the brake 2.

The present invention proposes a method for rotating the output axis 1 of the motor by the external torque Tm even during operation of the brake 2.

First, the following is a condition to rotate the output axis 1 of the motor by a torque that is equal to or lower than the external torque Tm.

$$To - Tb \leq Tm \quad (6)$$

From the equations (1) and (6), following equations are obtained.

$$To - Tb = Tf + Tm - Tb \leq Tm$$

$$Tf \leq Tb \quad (7)$$

From the equations (2) and (7), the following condition is required to rotate the output axis 1 of the motor by the external torque Tm.

$$Tf \leq Tb < To \quad (8)$$

or $$Tf \leq Tb < Tf + Tm \quad (9)$$

That is, "the brake torque Tb is increased or decreased" in accordance with "an increase or decrease in the load torque Tf" or "a decrease or increase in the external torque Tm". This will be concretely described with reference to a graph that shows variations of each torque with time.

Figure 4:
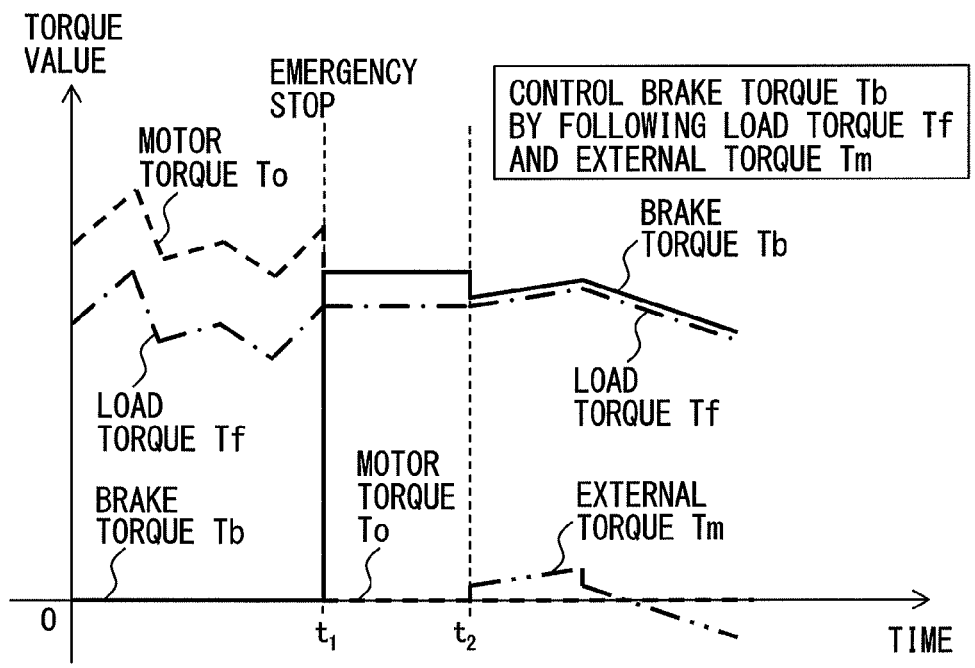
FIG. 4 is a graph showing variations with time in a motor torque, a load torque, a brake torque, and an external torque.

FIG. 4 shows variations with time in the motor torque To, the load torque Tf, the brake torque Tb, and the external torque Tm. In FIG. 4, the motor performs a normal operation between a time 0 and a time $t_1$. In this period, the motor torque To and the load torque Tf have torque values of certain levels, while the brake torque Tb is zero.

An emergency stop of the motor is performed at the time $t_1$. After the time $t_1$ at which the emergency stop is performed, the motor torque To becomes zero. On the other hand, the brake torque Tb has a torque value of a predetermined level after the emergency stop.

When the external torque Tm is applied at a time $t_2$, as shown in FIG. 4, the controller 4 controls the brake torque Tb by following the load torque Tf and the external torque Tm. In this manner, the controller 4 decreases or increases the brake torque Tb of the brake 2 during operation of the brake 2 (after the time $t_2$) in accordance with an increase or decrease in the external torque Tm detected by the sensor 3.

To achieve the above operation, the motor according to the embodiment of the present invention has the following features.

(i) The motor varies the brake torque Tb of the brake 2.

(ii) The motor has the sensor 3 to measure the motor torque To of the output axis 1 of the motor.

(iii) The motor detects the load torque Tf by measuring the motor torque (torque of output axis) To in the absence of the external torque Tm (external force), or calculates the load torque Tf from a torque command or the like in the controller 4 (in the case of a robot, the load torque Tf is calculated from the weight of a work or the posture of the robot).

(iv) To achieve (i) to (iii) even in case of a power failure, the motor is preferably provided with a rechargeable power supply (described later).

According to the motor of the first embodiment of the present invention, it is possible to arbitrarily change the posture of a robot, even when the motor cannot be driven due to an emergency stop, a power failure, or the like.

[Second Embodiment]

Figure 5:
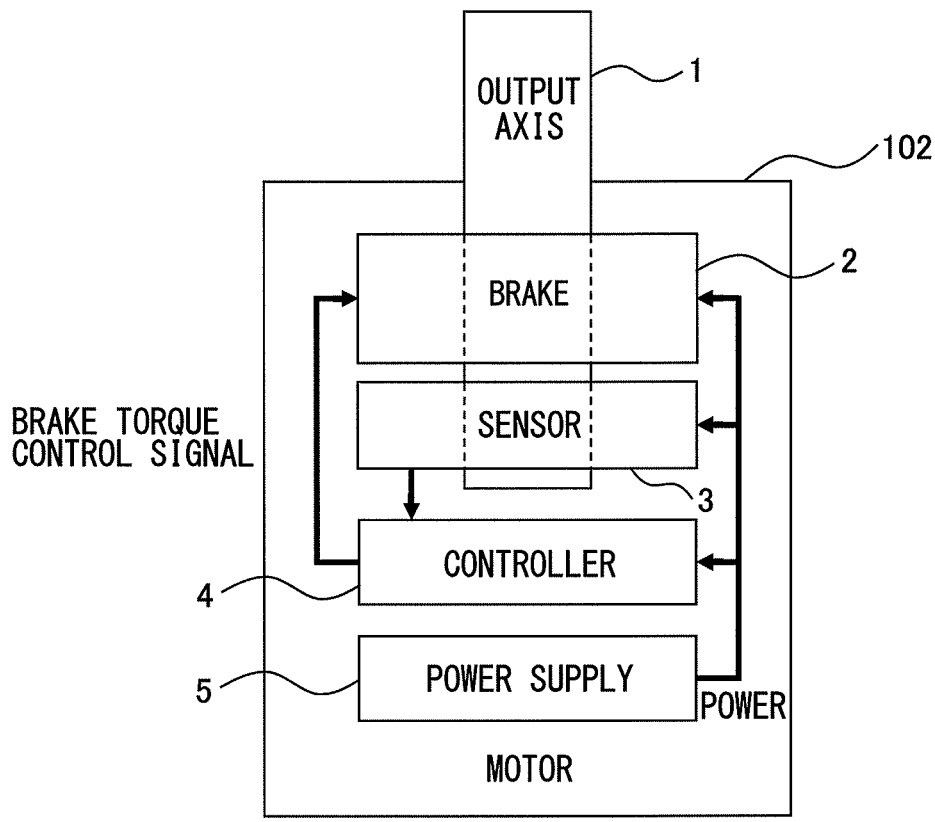
FIG. 5 is a block diagram of a motor according to a second embodiment of the present invention.

Next, a motor according to a second embodiment of the present invention will be described. FIG. 5 is a block diagram of the motor according to the second embodiment of the present invention. The difference between a motor 102 according to the second embodiment of the present invention and the motor 101 (FIG. 3) according to the first embodiment is that the motor 102 further includes a rechargeable power supply 5 for supplying power to the brake 2, the sensor 3, and the controller 4. The other configuration of the motor according to the second embodiment is the same as that of the motor according to the first embodiment, so a detailed description is omitted.

As an example of the power supply 5, a storage battery, an electrolytic capacitor, or the like can be used. However, not limited thereto, another power supply may be used.

In the motor according to the second embodiment, as shown in FIG. 5, the brake 2, the sensor 3, the controller 4, and the power supply 5 are disposed inside the motor 102, but a part or all of these components may be disposed outside the motor 102. Furthermore, the output axis 1 may be fitted later to the motor 102.

According to the motor of the second embodiment of the present invention, the provision of the power supply allows supplying power to each of the brake, the sensor, and the controller even in case of a power failure.

[Third Embodiment]

Figure 6:
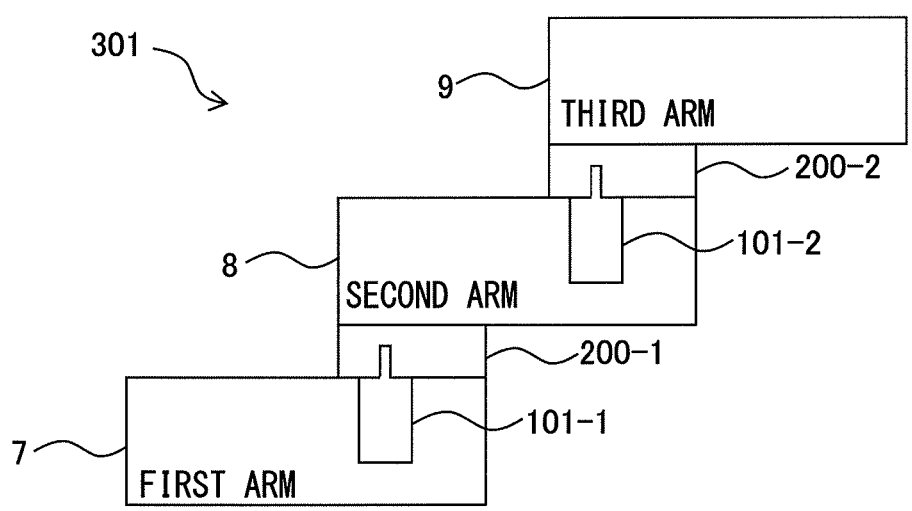
FIG. 6 is a block diagram of arms of a robot according to a third embodiment of the present invention.

Next, a robot according to a third embodiment of the present invention will be described. FIG. 6 is a block diagram of arms of the robot according to the third embodiment of the present invention. A robot 301 according to the third embodiment of the present invention has the motor according to the first or second embodiment.

An articulated robot is taken as an example of the robot 301. As shown in FIG. 6, a plurality (101-1 and 101-2) of motors 101 according to the first embodiment are provided in the arms of the robot 301. A first motor 101-1 is disposed in a first arm 7. A second motor 101-2 is disposed in a second arm 8. A first mechanism 200-1 is disposed between the first arm 7 and the second arm 8. A second mechanism 200-2 is disposed between the second arm 8 and a third arm 9.

FIG. 6 shows the robot 301 having the two motors, by way of example, but not limited thereto, the number of the motors may be one or three or more. Furthermore, FIG. 6 shows the robot 301 having the plurality (101-1 and 101-2) of motors 101 according to the first embodiment, by way of example, but the robot 301 may have one or a plurality of motors 102 according to the second embodiment.

In the robot 301 according to the third embodiment, a pressure sensor, a piezoelectric sensor, or the like can be used as the sensor. However, not limited thereto, another sensor may be used.

According to the robot of the third embodiment of the present invention, it is possible to arbitrarily change the posture of the robot, even when the motor cannot be driven due to an emergency stop, a power failure, or the like.

[Fourth Embodiment]

Figure 7:
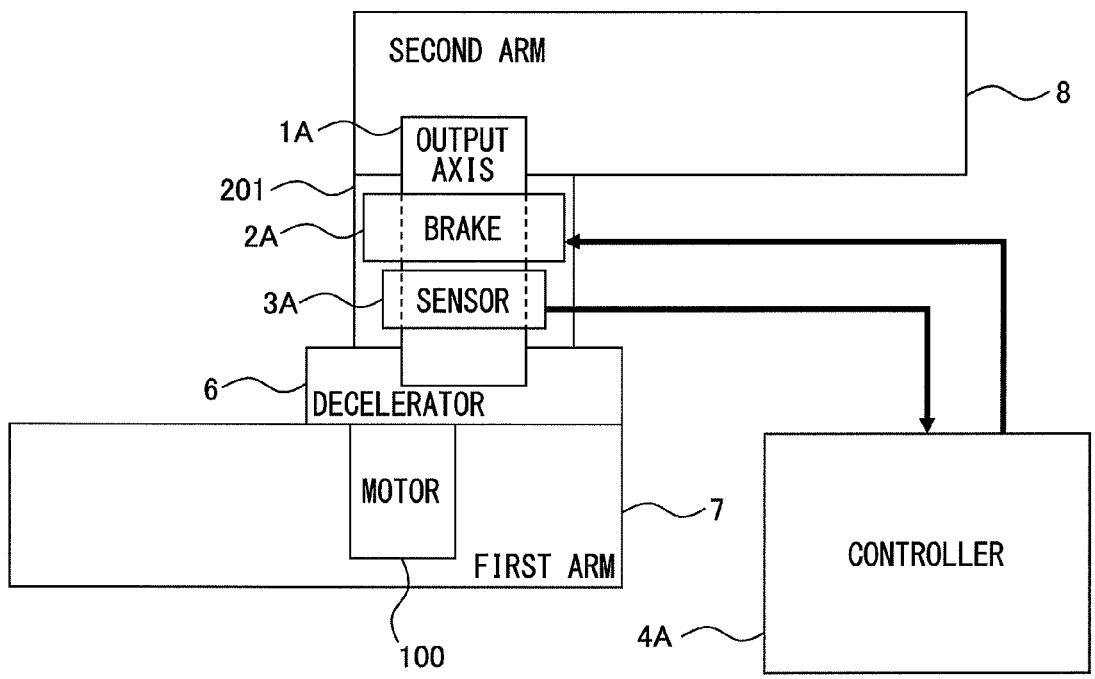
FIG. 7 is a block diagram of a mechanism according to a fourth embodiment of the present invention.

Next, a mechanism according to a fourth embodiment of the present invention will be described. FIG. 7 is a block diagram of the mechanism according to the fourth embodiment of the present invention. A mechanism 201 according to the fourth embodiment of the present invention is a mechanism having a drive motor 100. The mechanism 201 includes an output axis 1A, a brake 2A, a sensor 3A, and a controller 4A. The mechanism 201 is disposed between the first arm 7 and the second arm 8 through a decelerator 6.

The brake 2A holds the output axis 1A. As the brake 2A, a powder brake, an electromagnetic brake, a magnetic hysteresis brake, or the like can be used. The electromagnetic brake is a brake that controls a gap using a current value. However, not limited thereto, another brake may be used.

The brake 2A may be disposed in any of [1] inside the decelerator 6, [2] between the arm 7 or 8 and the decelerator 6, and [3] between the motor 100 and the decelerator 6. FIG. 7 shows an example in which the brake 2 is disposed between the second arm 8 and the decelerator 6 (the case of the above [2]), but not limited thereto, may be disposed in the position of the above [1] or [3].

The sensor 3A detects an external torque applied from outside to the output axis 1A. The external torque data detected by the sensor 3A is outputted to the controller 4A. As the sensor 3A, an acceleration sensor, a strain sensor, or the like can be used. However, not limited thereto, another sensor may be used. The sensor 3A is disposed in the mechanism 201 in the example of FIG. 7, but not limited thereto, may be disposed in the controller 4A.

The controller 4A decreases or increases the torque of the brake 2A during operation of the brake 2A in accordance with an increase or decrease in the external torque detected by the sensor 3A. To decrease or increase the torque of the brake 2A, the controller 4A outputs a brake torque control signal to the brake 2A.

In the mechanism according to the fourth embodiment, as shown in FIG. 7, the controller 4A may be contained in the decelerator 6, the first arm 7, or the second arm 8.

Figure 8:
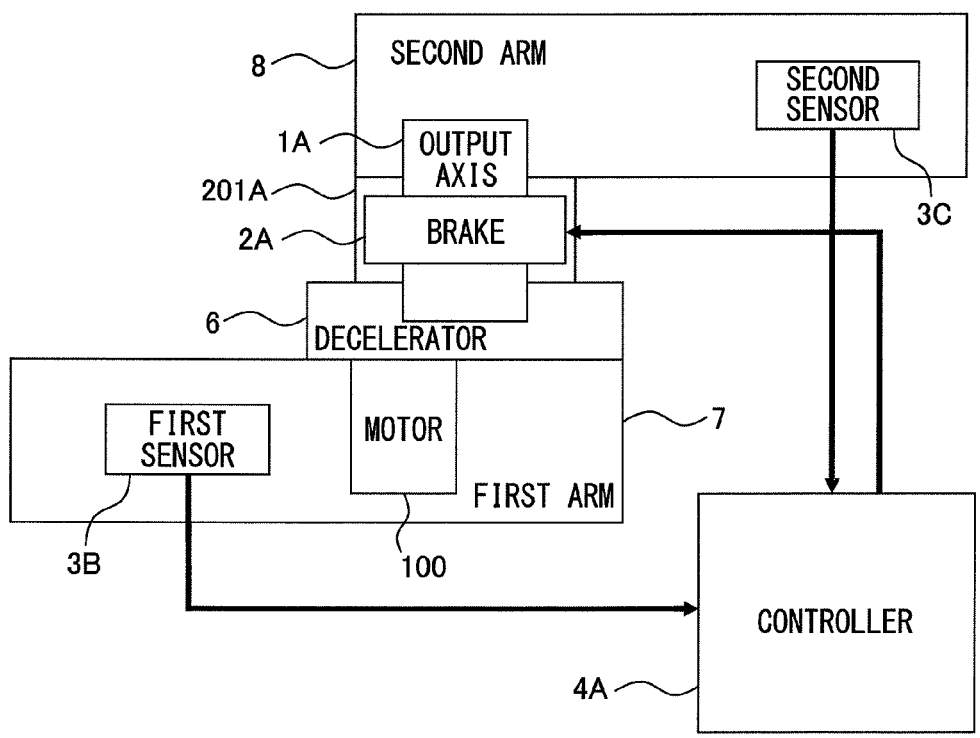
FIG. 8 is a block diagram of a mechanism according to a modification example of the fourth embodiment of the present invention.

Next, a mechanism according to a modification example of the fourth embodiment of the present invention will be described. FIG. 8 is a block diagram of the mechanism according to the modification example of the fourth embodiment of the present invention. The difference between a mechanism 201A according to the modification example of the fourth embodiment and the mechanism 201 according to the fourth embodiment is that sensors are disposed in the arms, instead of the sensor disposed in the mechanism. FIG. 8 shows an example in which a first sensor 3B is disposed in the first arm 7 and a second sensor 3C is disposed in the second arm 8, instead of the sensor 3A (FIG. 7). External torque data detected by the first sensor 3B and the second sensor 3C is outputted to the controller 4A.

According to the mechanism of the fourth embodiment of the present invention, it is possible to arbitrarily change the posture of the robot, even when the motor cannot be driven due to an emergency stop, a power failure, or the like.

[Fifth Embodiment]

Figure 9:
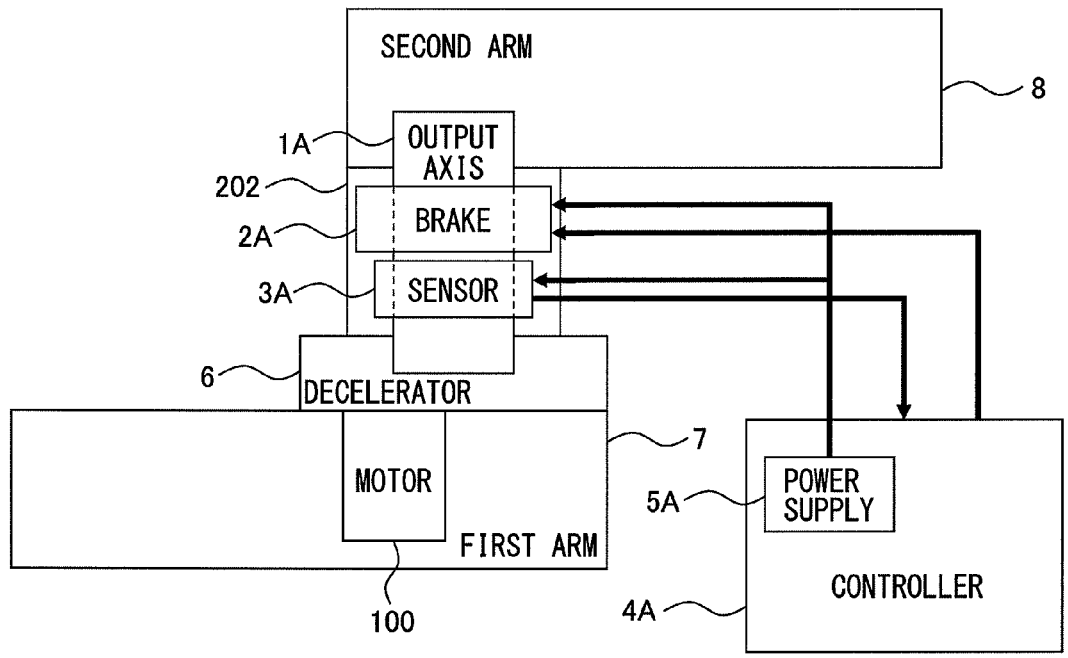
FIG. 9 is a block diagram of a mechanism according to a fifth embodiment of the present invention.

Next, a mechanism according to a fifth embodiment of the present invention will be described. FIG. 9 is a block diagram of the mechanism according to the fifth embodiment of the present invention. The difference between a mechanism 202 according to the fifth embodiment of the present invention and the mechanism 201 (FIG. 7) according to the fourth embodiment is that the mechanism 202 includes a rechargeable power supply 5A for supplying power to the brake 2A, the sensor 3A, and the controller 4A. The other configuration of the mechanism according to the fifth embodiment is the same as that of the mechanism according to the fourth embodiment, so a detailed description is omitted.

As an example of the power supply 5A, a storage battery, an electrolytic capacitor, or the like can be used. However, not limited thereto, another power supply may be used.

As shown in FIG. 9, in the mechanism 202 according to the fifth embodiment, the power supply 5A is disposed inside the controller 4A. However, the power supply 5A may be contained in the decelerator 6, the first arm 7, or the second arm 8.

Figure 10:
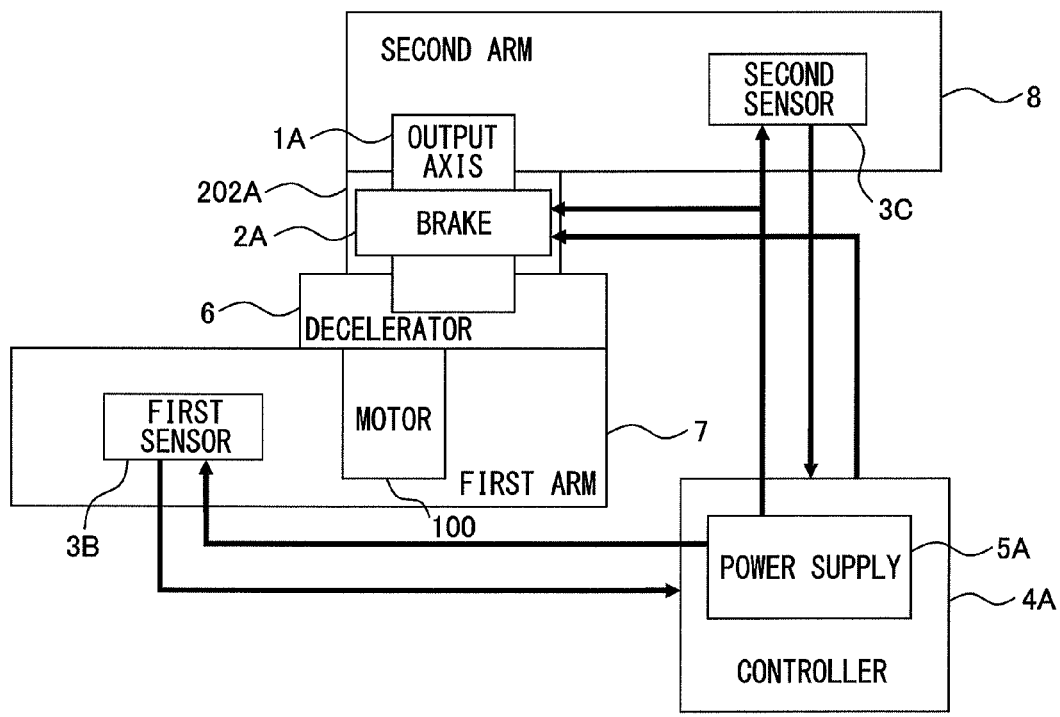
FIG. 10 is a block diagram of a mechanism according to a modification example of the fifth embodiment of the present invention.

Next, a mechanism according to a modification example of the fifth embodiment of the present invention will be described. FIG. 10 is a block diagram of the mechanism according to the modification example of the fifth embodiment of the present invention. The difference between a mechanism 202A according to the modification example of the fifth embodiment and the mechanism 202 according to the fifth embodiment is that sensors are disposed in the arms, instead of the sensor disposed in the mechanism. FIG. 10 shows an example in which the first sensor 3B is disposed in the first arm 7 and the second sensor 3C is disposed in the second arm 8, instead of the sensor 3A (FIG. 9). External torque data detected by the first sensor 3B and the second sensor 3C is outputted to the controller 4A.

According to the mechanism of the fifth embodiment of the present invention, the provision of the power supply allows supplying power to each of the brake, the sensor, and the controller even in case of a power failure.

[Sixth Embodiment]

Figure 11:
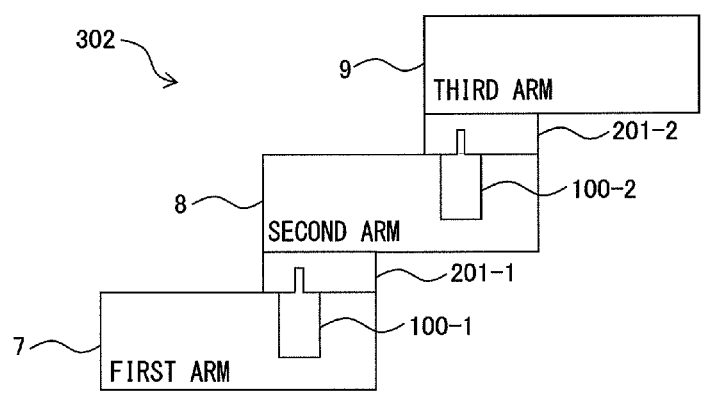
FIG. 11 is a block diagram of arms of a robot according to a sixth embodiment of the present invention.

Next, a robot according to a sixth embodiment of the present invention will be described. FIG. 11 is a block diagram of arms of the robot according to the sixth embodiment of the present invention. A robot 302 according to the sixth embodiment of the present invention has the mechanism according to the fourth or fifth embodiment.

An articulated robot is taken as an example of the robot 302. As shown in FIG. 11, a plurality (201-1 and 201-2) of mechanisms 201 according to the fourth embodiment are provided in the arms of the robot 302. A third mechanism 201-1 is disposed between the first arm 7 and the second arm 8. A fourth mechanism 201-2 is disposed between the second arm 8 and the third arm 9. A third motor 100-1 is disposed in the first arm 7. A fourth motor 100-2 is disposed in the second arm 8.

FIG. 11 shows the robot 302 having the two motors, by way of example, but not limited thereto, the number of the motors may be one or three or more. Furthermore, FIG. 11 shows the robot 302 having the plurality (201-1 and 201-2) of mechanisms 201 according to the fourth embodiment, as an example, but the robot 302 may have one or a plurality of mechanisms 202 according to the fifth embodiment.

In the robot 302 according to the sixth embodiment, a pressure sensor, a piezoelectric sensor, or the like can be used as the sensor. However, not limited thereto, another sensor may be used.

According to the robot of the sixth embodiment of the present invention, it is possible to arbitrarily change the posture of the robot, even when the motor cannot be driven due to an emergency stop, a power failure, or the like.

What is claimed is:

1. A motor comprising:
   an output axis;
   a brake for holding the output axis by applying a brake torque, the output axis being locked when the brake torque is applied on the output axis;
   a sensor for detecting an external torque applied to the output axis from outside; and
   a controller for decreasing or increasing the brake torque during operation of the brake in accordance with an increase or decrease in the external torque detected by the sensor so as to rotate the output axis.

2. The motor according to claim 1, further comprising a rechargeable power supply for supplying power to the brake, the sensor, and the controller.

3. A robot comprising the motor according to claim 1.

4. A mechanism having a drive motor, comprising:
   an output axis of the mechanism;
   a brake for holding the output axis by applying a brake torque, the output axis being locked when the brake torque is applied on the output axis;
   a sensor for detecting an external torque applied to the output axis from outside; and
   a controller for decreasing or increasing the brake torque during operation of the brake in accordance with an increase or decrease in the external torque detected by the sensor so as to rotate the output axis.

5. The mechanism according to claim 4, further comprising a rechargeable power supply for supplying power to the brake, the sensor, and the controller.

6. A robot comprising the mechanism according to claim 4.

* * * * *